United States Patent [19]

Hansen

[11] 4,394,779
[45] Jul. 19, 1983

[54] METHOD AND SYSTEM FOR RECEIVING DISTORTION-FREE FM SIGNALS BY VEHICULAR RADIOS

[75] Inventor: Jens Hansen, Diekholzen, Fed. Rep. of Germany

[73] Assignee: Robert Bosch GmbH, Stuttgart, Fed. Rep. of Germany

[21] Appl. No.: 231,953

[22] Filed: Feb. 6, 1981

[30] Foreign Application Priority Data

Feb. 22, 1980 [DE] Fed. Rep. of Germany ....... 3006627

[51] Int. Cl.³ ............................................. H04B 1/10
[52] U.S. Cl. .................................. 455/277; 455/278; 455/345; 455/297; 455/289; 343/100 AD; 343/100 CS; 343/713; 343/725
[58] Field of Search ............... 455/272, 289, 277, 278, 455/297, 345; 343/100 AD, 100 CS, 100 SA, 711, 725, 727, 729, 854, 876, 713

[56] References Cited

U.S. PATENT DOCUMENTS

| | | | |
|---|---|---|---|
| 2,171,218 | 8/1939 | Kriebel | 343/100 CS |
| 2,485,576 | 10/1949 | Dodington | 455/277 |
| 3,503,070 | 3/1970 | Kompfner | 455/279 |
| 3,996,592 | 12/1976 | Kline et al. | 343/876 |

FOREIGN PATENT DOCUMENTS 2514181 9/1975 Fed. Rep. of Germany ...... 455/277

*Primary Examiner*—Jin F. Ng
*Attorney, Agent, or Firm*—Frishauf, Holtz, Goodman & Woodward

[57] ABSTRACT

Reflected signal distortion in vehicular FM receivers is eliminated or largely suppressed by providing a plurality of antenna elements of the vehicle antenna (13, 100) with different directional characteristics, which are selectively connected to the vehicle receiver (10, 30; 104, 106) if a reflection is sensed in the reflection recognition stage (30, 106). In one embodiment (FIG. 1), the antenna (13) is subdivided into an upper and a lower portion (14, 15), about one-third down its length, the lower portion being surrounded by shielding elements (17–20) positioned about 90° offset from each other, and selectively connectable to, or disconnectable from, ground or vehicle chassis in dependence on sensed distortion or reflection recognition pulses, to reduce the effective antenna length and change the directivity. Upon elapse of a predetermined time interval of between 3 to 10 seconds, for example, as determined by a monostable multivibrator (59, 109), either the main antenna is reconnected or the directivity changed. In another embodiment, a main rod antenna (100) can be disconnected and antenna strips (10, 102), positioned close to the window frames of the windshield and hence providing different shielding and directional characteristics, being connectable under control of reflection recognition pulses.

14 Claims, 5 Drawing Figures

METHOD AND SYSTEM FOR RECEIVING DISTORTION-FREE FM SIGNALS BY VEHICULAR RADIOS

The present invention relates to reception of frequency modulated (FM) signals by vehicular radios, such as automobile radios, and more particularly to reception of such signals in which distortion, and particularly phase-distortion is effectively reduced.

BACKGROUND

It has previously been proposed to reduce the distortion, and particularly phase distortion, when receiving FM signals in vehicular radios by utilizing two antennae and providing a switch-over device in the receiver which recognizes reflections occurring in the signals received by one of the antennae and, if such recognition is positive, switching over reception to the other antenna. Such a system is described in German Patent Disclosure Document DE-OS 25 14 181, SYKES. Problems which arise in the reception of FM signals in automobile radios which occur when using a single antenna are intended to be avoided by switching over from one antenna to another if the received signals are subject to spurious paths or involve multi-path reception or included reflected or "ghost" signals. The receiving system as described in the aforementioned publication has two antennae, positioned at different locations on the vehicle. The receiver includes a switch-over device which is connected to the radio frequency (RF) preamplifier stage of the radio. The switch-over device is energized in dependence on the respective amplitude of the output signal from the intermediate frequency (IF) amplifier of the automobile radio in such a manner that only that one of the antennae is used which has the best incoming signal. The two respectively different receiving antennae have different directional reception characteristics. This is a necessary requirement for trouble-free operation of such system, since the simultaneous occurrence of reflections of the signals at both the antennae is highly unlikely.

The system as described operates well when the reflection paths are short. In certain locations, such as in built-up urban areas, in mountainous regions and the like, where multi-reflected paths of signals occur frequently, the arrangement as described still does not provide essentially distortion-free reception.

THE INVENTION

It is an object to improve FM radio reception in mobile radios, particulwrly in automobile radios, by effectively compensating for multi-path and particularly long multi-path reflection so that the reception of incoming signals will be essentially distortion-free.

Briefly, the antenna for the FM receiver has a main antenna element which is essentially similar to the customary antenna used in automobile receivers; in addition, the antenna contains auxiliary directivity elements which are short with respect to the main antenna element, located for example in cylindrical arrangement about the main antenna element. The receiver has a distortion recognition stage. Normally, the RF stage of the receiver is connected to the main antenna element. If the distortion recognition stage recognizes distortion characteristics of the signal, the main antenna element is disconnected and a short antenna element of a different directional characteristic is connected to the RF stage of the receiver. This connection is maintained for a predetermined time interval. If, at the end of the time interval, distortion is still or again sensed, the RF stage is switched to another one of the auxiliary antennae, that is, to an auxiliary element which has a different directional characteristic. If, after the elapse of the time interval, no distortion is recognized anymore, however, then the receiver is again switched back to the main antenna element. The steps of starting a timing interval, and then determining if the received signal still is distorted or not, and switching to another auxiliary antenna element or to the main antenna, respectively, is then repeated for consecutive auxiliary antenna elements.

The method and system has the advantage that the additional shortening of the auxiliary antennae with respect to the main antenna improves the rejection of wave components which are necessary for distortion due to reflection, namely direct waves short-path reflected waves and long-path reflected waves. The simultaneous occurrence of all these three factors, with the change in directional preference of the auxiliary antenna, is unlikely.

In a preferred form, directivity elements are so constructed and arranged that they surround a singular rod or whip-type antenna, insulated therefrom by an insulating segment. Each one of the auxiliary directivity elements are connected to electronic transfer switches. The electronic switches are controlled by an electronic switching control device. The electronic switching control device connects respective directively or shielding segments to ground or vehicle chassis; that portion of the antenna rod element which is not shielded by the shielding segment or segments can be separated by a further switch controlled by the switching control system. This arrangement has the advantage of compact construction and requires only a single antenna attachment or antenna junction element on the vehicle body or chassis.

DRAWINGS

Figure 1:
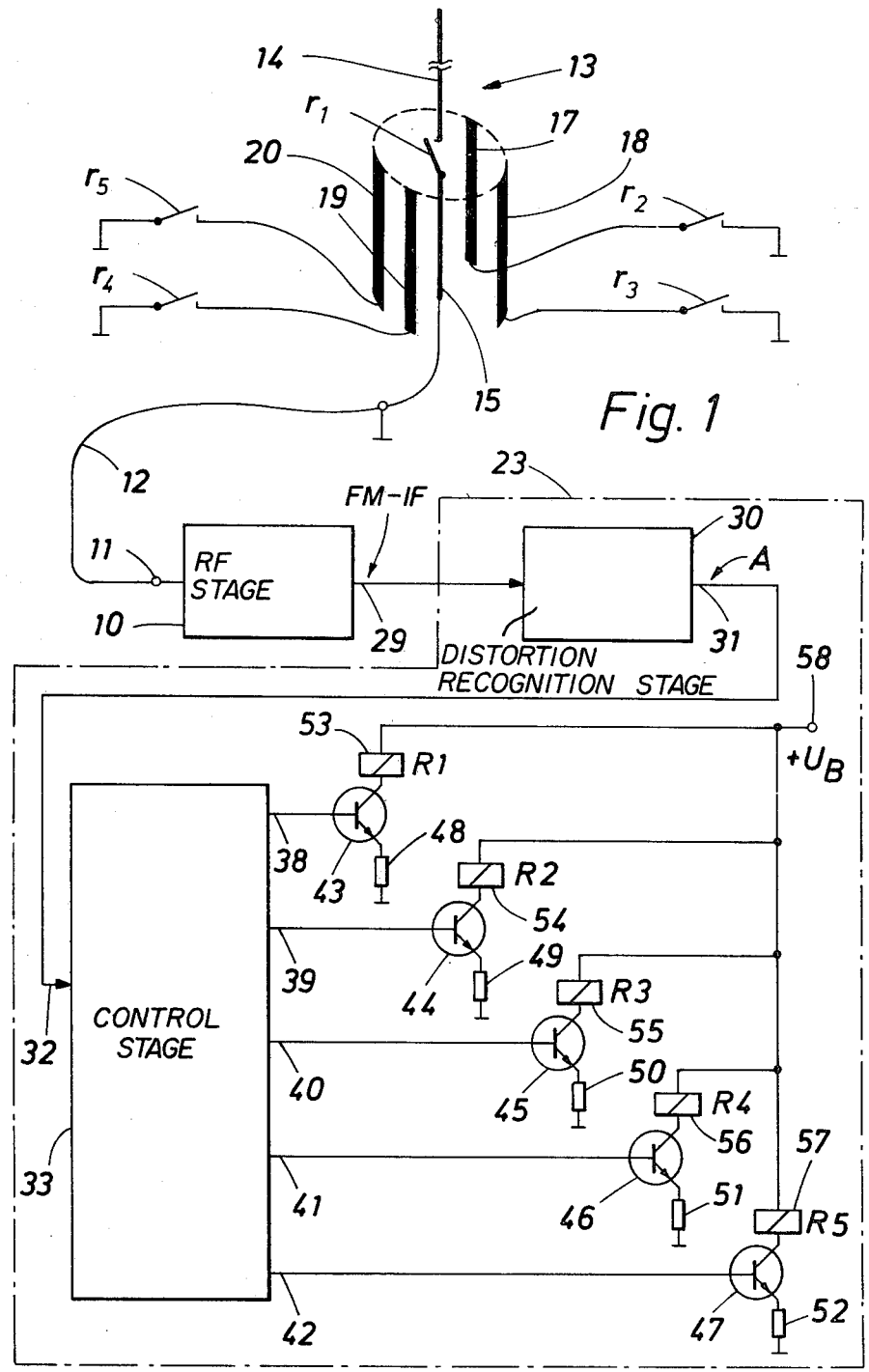
FIG. 1 is a highly schematic block diagram of an FM automobile radio system incorporating the present invention.

An FM RF stage 10 of an FM automobile radio (FIG. 1) has an RF input 11 which is connected over a shielded coaxial line 12 with the lower connection point of a rod or whip vehicle antenna 13. The vehicle antenna itself has two coaxial antenna rod portions 14, 15 which can be connected by a first switch $r_1$, and further includes four antenna shielding elements 17, 18, 19, 20, distributed about the circumference of the lower antenna rod element 15. The shielding segments are insulated with respect to the lower antenna rod 15, and can be selectively connected with ground or chassis over respective switches $r_2, r_3, r_4, r_5$.

The RF stage 10 of the radio has an output 29 which furnishes the FM intermediate frequency (IF) signal. The terminal 29 is connected to a distortion, or reflection recognition stage 30, the output 31 of which is connected to an input 32 of a digital control unit or control stage 33. The control stage has five outputs 38, 39, 40, 41, 42 which, each, are connected to the base of an npn transistor 43, 44, 45, 46, 47. Emitter resistors 48 ... 52 are connected between the emitters of the respective transistors and chassis. The collectors of the respective transistors are connected through the control windings 53, 54, 55, 56, 57 of respective relays R1, R2, R3, R4, R5 with a source of operating potential connected at terminal 58, and shown as $+U_B$. The relays R1 ... R5 each control one of the switches $r_1 \ldots r_5$. Preferably, the length of the lower portion 15 of the antenna rod and of the shielding segment 17 ... 20 is about one-third of the overall length of the rod antenna 13.

The remaining portions of the automobile radio receiver and connected to the terminal 29, such as demodulation audio and amplifier stages, are not shown since they can be standard and in accordance with any well known and desired construction. Only that portion of the receiver is shown which is necessary for an understanding of the present invention, namely how to achieve distortion-free reception.

Basic Operation: Let it be assumed, first, that the relay R1 is energized and that, therefore, switch $r_1$ is closed. This is the normal position. The switches $r_2$–$r_5$ are open. The antenna 13, thus, operates similarly to a commercial rod antenna as well known. Its preferred length is about $\lambda/4$, in which the length is selected to match the approximate median operating wave length of the FM frequency range. This antenna has practically no directional receiving preference characteristics.

The distortion, or reflection recognition stage 30 will provide a reflection distortion signal at its output 31 if the signal derived from the RF stage 10 is subjected to a reflection distortion. The distortion recognition pulse is applied from the output 31 to the control stage 32 which, then, will so react that the relay R1 is energized and the switch $r_1$ will open. This leaves only the lower portion 15 of the antenna rod connected to the input 11 of the RF stage 10 of the radio. By reduction of the length of the antenna 13, the sensitivity to reflection distortion becomes less. Simultaneously, the control stage 33 will so control the remaining relays that the relay R2 will be de-energized, while the relays R3, R4, R5 will be energized. This opens the switch $r_2$, and thus separates the shielding segment 17 from ground or chassis. The switches $r_3, r_4, r_5$, being closed, are connected to ground or chassis, so that the shield segments 18, 19, 20 are grounded. When the switches $r_1, r_2, r_3$–$r_5$ assume this switching state, the antenna will have a predetermined directional characteristic which has a maximum in the direction of the ungrounded or floating shielding segment 17.

Relay $R_1$, in this embodiment, is of the normally closed (NC) type, whereas the relays R2–R5 are of the normally open (NO) type. Under normal reception, therefore, with all relays de-energized, switch $r_1$ is closed and switches $r_2$–$r_5$ are open, but a response due to output from the reflection recognition stage 30 causing selective energization of selected relays, as will appear.

If no further reflections are recognized within a predetermined period of time, that is, if no further reflection recognition pulse appears at terminal 31, the relays revert to de-energized state which separates all shield segments 17–20 through the respective switches $r_2$–$r_4$ from ground or chassis, and the entire antenna is reconnected by closing of the NC relay switch r. The antenna 13 is effective throughout its entire length.

Upon furnishing of a second reflection recognition pulse at terminal 31, indicative of further distorted reception, the relay chain R2–R5 will step down one relay; relay R2 will be energized, relay R3 de-energized, and relays R4 and R5 will be energized, placing the shielding segments 17, 19 and 20 at ground or shielding potential while separating the shielding segment 18 from ground or chassis. Switch $r_1$, controlled by the relay R1, remains open. The antenna continues effective only through its shorter length, that is, portion 15, but now with a different directional preference, with a maximum lobe in the direction of the disconnected shielding segment 18.

The cycle will repeat, sequentially, so that, upon each new reflection recognition pulse, a different shielding segment is separated from ground or chassis, the remaining shielding segments being connected to ground or chassis. Each new reflection recognition pulse thus provides a different change in directional characteristics of the antenna, in the embodiment shown offset with respect to the preceding directional lobe by 90°, until reflection distortion is sensed no longer; upon termination of sensing of reflection distortion, the entire antenna 13 again becomes effective.

Figure 2:
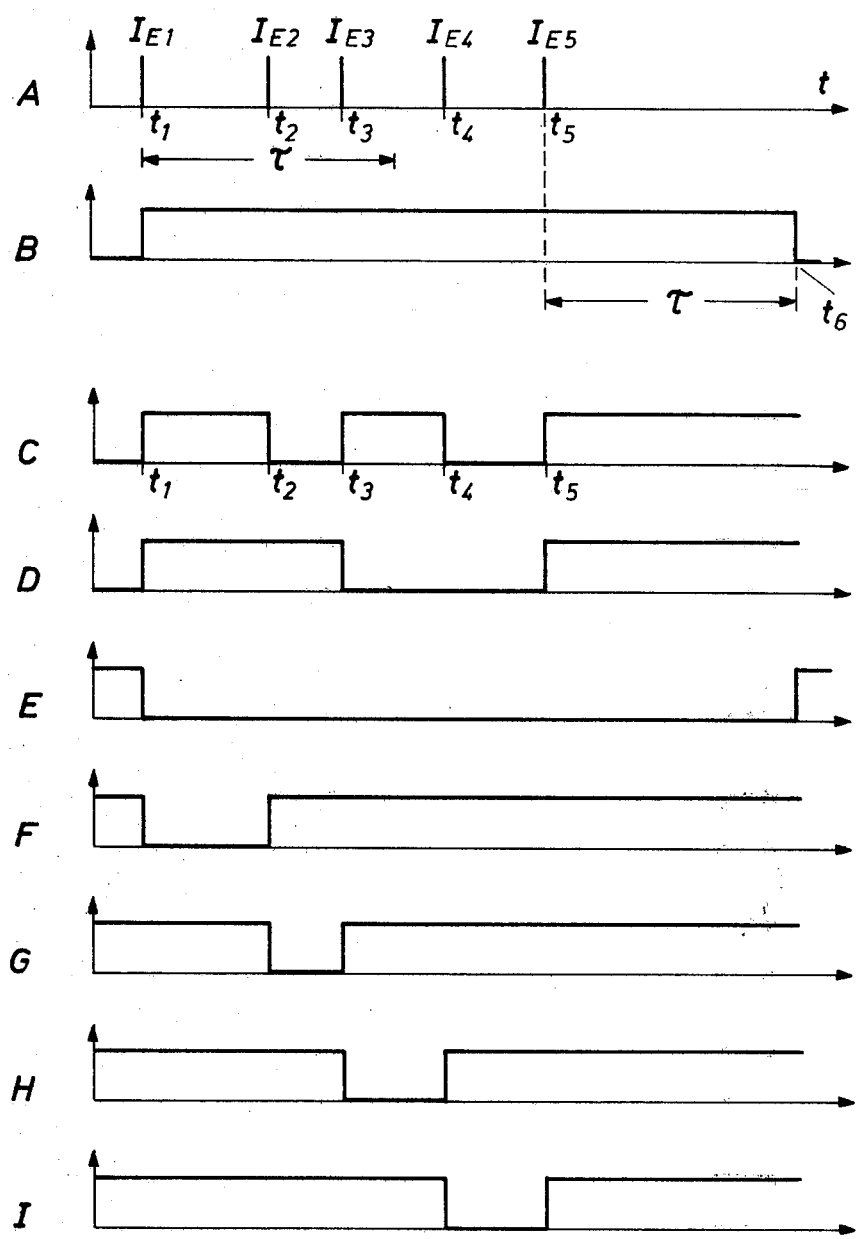
FIG. 2 is a series of timong graphs of voltage with respect to time illustrating signals which arise in the system.
Figure 3:
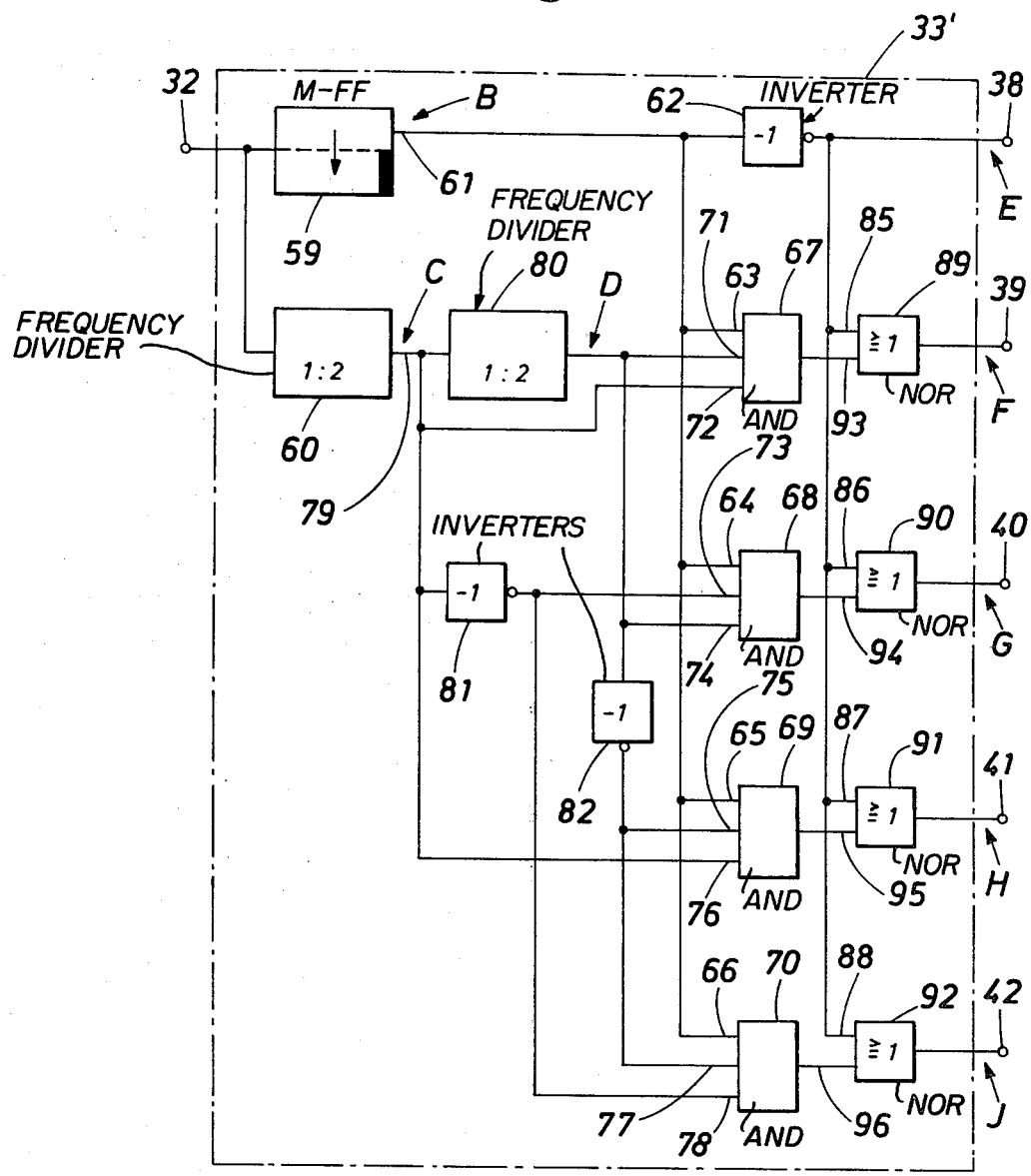
FIG. 3 is a block diagram of a digital control device for the RF receiving stage in accordance with FIG. 1, and in which the letter designations on the figure illustrate the points at which the signals of FIG. 2, and having the same letter designation, occur.

The control stage is shown in greater detail in FIG. 3, and the operation will best be understood by connection of the timing diagrams of FIG. 2.

The input terminal 32 (FIGS. 1, 3) of the control stage 33' is connected to the monostable flip-flop (M-FF) 59 and to a first frequency divider 60. The output 61 of M-FF 59 is connected to an inverter 62 and to respective inputs 63, 64, 65, 66 of first, second, third and fourth AND gates 67, 68, 69, 70. The AND-gates each have three inputs 63, 71, 72; 64, 73, 74; 65, 75, 76; and 66, 77, 78.

A second frequency divider 80 is connected to the output 79 of the first frequency divider 60. The output 79 is further connected to the input 72 of the first AND-gate 67. Additionally, the output 79 is connected to a second inverter 81 and to the input 76 of the third AND-gate 69. The output from the second frequency divider 80 is connected to the second input 71 of the first AND-gate 67 and to the third input 74 of the second AND-gate 68. It is additionally connected to a third inverter 82, the output of which is connected with the second input 75 of the third AND-gate 69 and with the second input 77 of the fourth AND-gate 70. The output of the second inverter 82 is also connected to the second input 73 of the second AND-gate 68 and further to the third input 78 of the fourth AND-gate 70.

The output of the first inverter 62 is connected to the first output 38 (FIG. 1) of the control stage 33. It is, additionally, connected with a first input 85, 86, 87, 88 of a first, second, third and fourth NOR-gate 89, 90, 91, 92, respectively. The second respective inputs 93, 94, 95, 96 are connected each, with an output of the first to fourth AND-gate 67–70, respectively. The outputs of the respective NOR-gates 89–92 form the second to fifth outputs 39–42 of the control stage 33 (see also FIG. 1).

The M-FF 59 has a timing interval $\tau$ of preferably in the order of about 3-10 seconds. The frequency divider 60, 68 each have a division ratio of 1:2.

Operation, with reference also to FIG. 2: Let it be assumed that the reflection recognition stage 30 does not recognize any reflection in the received signal, see time in advance of the timing instant $t_1$, graph A of FIG. 2. The M-FF 59 will provide at its output 61 a 0-signal, which is converted in the first inverter stage 62 into a 1-signal. The 1-signal is applied to the output 38.

The system as described in connection with FIG. 1 was based on the relay R1 being a normally closed relay; for various applications, and specifically as described in connection with FIG. 3, the relay R1 can also be a normally open relay, in which case, for normal, reflection-free operation, relay R1 is energized. This modification, which merely involves connecting the output 38 behind the inverter 62, rather than in its advance, will be explained in connection with the system shown in FIG. 3.

In advance of the time interval $t_1$, the M-FF thus will provide the 0-signal which is inverted by the inverter stage 62 to a 1-signal which, at the output 38, controls the first transistor 43 to saturation, thus causing energization of the relay R1, and hence closing of the switch $r_1$, see also FIG. 2, graph E. The NOR-gates 89-92 provide a 0-signal at the respective outputs 39-42, since the output of the first inverter stage 62 applied to the respective inputs 85-88 will cause the output to be a 0-signal regardless of the signals applied to the second inputs 93-96 of the NOR-gates. Thus, the relays R2-R5 will be de-energized, and the switches $r_2$-$r_5$ will be open. Consequently, antenna 13 will be effective throughout its full length, that is, portions 14, 15 connected by switch $r_1$, and the antenna will act like a normal vehicular rod or whip antenna.

Let it be assumed that at the time interval $t_1$ a reflection distortion is recognized in the receiver. The reflection distortion recognition circuit 30 will provide a reflection recognition pulse $I_{E1}$, see FIG. 2, graph A. The M-FF 59 will switch over and provide at its output 61 a 1-signal—see FIG. 2, graph B—which is inverted in the inverter stage 62 into a 0-signal—see graph E, FIG. 2—thus causing blocking of the transistor 43. Relay R1 is de-energized, switch $r_1$ opens. The reflection recognition pulse $I_{E1}$ likewise is applied to the frequency divider 60, the output signal of which changes from 0 to 1, see FIG. 2, graph C. The 1-signal likewise causes the second frequency divider 80 to change over and provide a change-over from a 0-signal to a 1-signal at its output, see FIG. 2, graph D. Three inputs of the first AND-gate 67 now will have a 1-signal which provides a 1-signal at its output so that the 1-signal at the output of the first inverter stage 62 causes a 0-signal at the output of the first NOR-gate, causing blocking of the transistor 44, de-energization of the relay R2, and opening of the switch $r_2$. The inverter stages 81, 82 control the outputs at terminals 40-42 so that the transistors 45-47 will remain in saturation by providing inverted signals at the output of the NOR-gates 90-92. Relays R3-R5 remain energized and switches $r_3$-$r_5$ closed. Consequently, and as explained above, only the lower portion 15 of the ship antenna 13 will become effective, the shield segments 18-20 are grounded, and the shield segment 17 separated from ground, giving the antenna the desired directional characteristics in the direction of the placement or position of the shield segment 17.

If no further reflection recognition pulse occurs within the unstable time $\tau$ of the M-FF 59, then the M-FF 59 will revert to its normal state at the end of the unstable time, and will then again provide at its output a 0-signal which is the same state as the one described above in advance of the time $t_1$, that is, in which the antenna 13 acts as a normal vehicular antenna.

The circuit 30 may, however, provide a further reflection recognition pulse $I_{E2}$ at a time interval $t_2$ in advance of the expiration of the timing period $\tau$ of the M-FF 59. The M-FF 59 thus has its unstable time extended, which does not change the logical state at its output 61 - see FIG. 2, graph B, since it occurred within the time period $\tau$ of the M-FF 59. The M-FF 59 thus continues to provide the 1-signal, relay R1 remains de-energized, and the switch $r_1$ open. The second reflection recognition pulse $I_{E2}$, however, is additionally applied to the frequency divider 60 which will change at its output 69 from a 1-signal to a 0-signal, see graph C, FIG. 2, time $t_2$. The second frequency divider 80 retains its 1-signal at its output, see FIG. 2, graph D. The result of this second pulse will be that the three inputs of the second AND-gate 68 will have 1-signals so that this circuit provides a 1-signal to the second input 94 of the second NOR-gate 90. The first input 86 continues to have a 0-signal thereon, and thus the base of the transistor 44 will receive a 1-signal, see FIG. 2, graph G, which causes relay R3 to become de-energized and the switch $r_3$ to open. The bases of the transistors 44, 46, 47 will continue to receive 1-signals, causing the relays R2, R4 and R5 to be energized and thus switches $r_2$, $r_4$, $r_5$ to be closed. The directional characteristic of the antenna thus has transferred from the direction of the shielding segment 17 to that of the shielding segment 18 since the switch $r_3$ is now open.

The graphs F to I of FIG. 2 clearly show that each new pulse $I_{E3}$... $I_{E5}$ will provide a 1-signal to respective outputs 41, 42 of the control unit 33 so that, sequentially, the next shielding segments 19, 20 are separated from ground or chassis, thus changing the directional characteristics of the antenna system.

The time interval $\tau$ shown in graph A of FIG. 2 is that of the normal time interval which, upon each pulse $I_E$... is again extended for a like time period.

The graphs further show that after the fifth reflection recognition pulse $I_{E5}$, time $t_5$ in FIG. 2, graph A, no further reflection pulses are received. The M-FF 39, upon termination of its unstable time $\tau$, that is, at time $t_6$, graph B, FIG. 2, reverts to its stable initial state, in which the output 61 provides a 0-signal, inverted in inverter 62 to a 1-signal maintaining switch $r_1$ closed and causing opening of the switches $r_2$-$r_5$, that is, the same condition which pertained in advance of time $t_1$. Again the antenna 13 oprates in the form of a normal rod or whip antenna.

Figure 4:
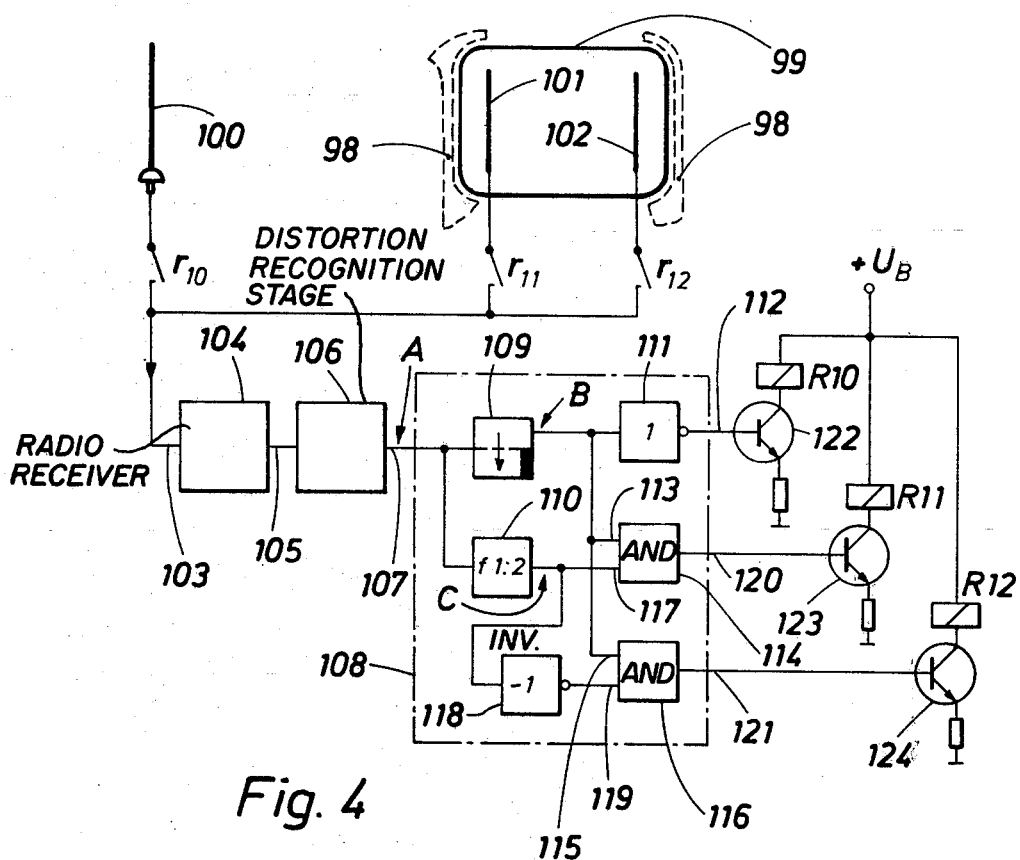
FIG. 4 is a highly schematic block diagram of another embodiment.

Embodiment of FIG. 4: Antennae of different dimension and directional characteristics are formed by the antenna elements 100, 101, 102. Antenna 100 is a normal rod or whip antenna secured, for example, to the body of a vehicle in customary and routine manner. The antenna elements 101, 102 are relatively short antennae having directional characteristics. These antennae may be conductive strips or the like applied to the vehicle at different locations, for example in or on the windshield, a rear window, or the like, and placed close to a framing element of the vehicle. As shown, the antenna elements 101, 102 are located on the front windshield 99, close to the window frame 98.

The three antenna elements are connected over respective switches $r_{10}$, $r_{11}$, $r_{12}$ to the input 103 of an FM automobile radio 104. The radio receiver 104 has an FM-IF output 105 which, similar to the embodiment of FIG. 1, is connected to a reflection recognition stage 106. The output 107 from the reflection recognition stage 106 is connected to a digital control unit 108. The digital control unit 108 has an M-FF 109 and a frequency divider 110. The output of the M-FF 109 is connected over an inverter 111 to a first output 112 of the control unit 108. The output of M-FF 109 is, additionally, connected to a first input 113 of a first AND-gate 114 and further with a first input 115 of a second AND-gate 116. The output from the frequency divider 110 is connected with the second input of the first AND-gate 114 and over a second inverter 118 with a second input 119 of the second AND-gate 116.

The output from the first AND-gate 114 forms a second input 120 of the control unit 108. The output of the second AND-gate 116 forms a third output 121 of the control unit 118. The outputs 112, 120, 121 are connected to the base of a respective transistor 122, 123, 124. The collectors of the respective transistors are connected through the excitation windings of the relays R10, R11, R12 to a source of positive voltage $+U_B$; the emitters are connected to ground or chassis through a customary emitter resistor.

Figure 5:
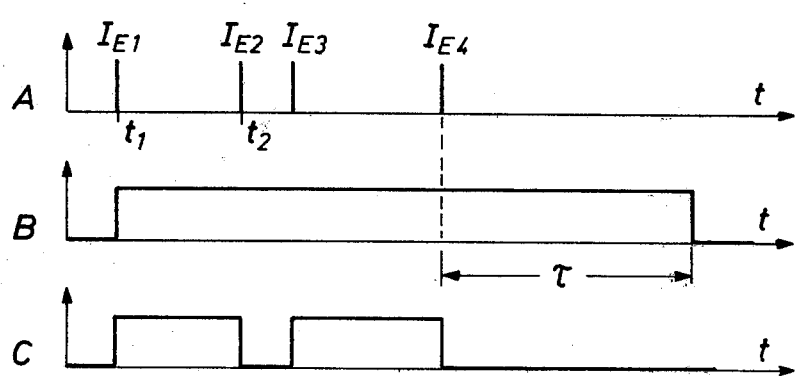
FIG. 5 is a voltage/time diagram, showing signals which occur at respectively similarly lettered points in the circuit of FIG. 4.

Operation, with reference to FIG. 5: The basic operation of the system is similar to that of FIG. 1. Under normal operation, and when first energized, the NO relay R10 carries current causing the relay switch $r_{10}$ to close so that the rod or whip antenna 100 will be connected. The NO relays R11 and R12 will be de-energized and hence the switches $r_{11}$, $r_{12}$ will be open. This is the condition shown in FIG. 5 before the time $t_1$.

Let it be assumed that at the instant of time $t_1$-graph A of FIG. 5-a reflection is sensed by the reflection recognition stage 106. Accordingly, a reflection recognition pulse $I_{E1}$ is provided which triggers the M-FF 109 to provide at its output a 1-signal, see graph B of FIG. 3. This 1-signal is inverted by the inverter stage 111 so that the base of tranisistor 122 will receive a 0-signal, thus causing transistor 122 to block. Relay R10 is de-energized and switch $r_{10}$ will open, separating the rod or whip antenna 100 from the input, 1-signals are however also applied to the inputs 113, 115 of the first AND-gate 114 which provides a 1-signal at the output 120 to cause transistor 123 to conduct, thus causing pull-in of the NO relay R11 and closing of switch $r_{11}$. The switch $r_{12}$ remains open. If a new reflection recognition pulse $1_{E2}$ is received at time $t_2$, that is, before the elapse of the unstable time of the M-FF 109, the switch R10 will remain open, and switch $r_{11}$ also open, but switch $r_{12}$ will close.

Upon first closing switch $r_{11}$, only the short antenna with the directional effect as determined by the-grounded-window frame 98 was effective. Now, the input is switched to another short antenna with a different directional effect, since the window frame will be located at the other side of the antenna element 102. The antenna elements 101, 102 are switched over whenever a new reflection recognition pulse is derived. If no further reflection recognition pulse is sensed after termination of the unstable time $\tau$, see FIG. 5, graph B, the switches $r_{11}$ and $r_{12}$ will open since the relays R11, R12 will be de-energized, and the switch $r_{10}$ will close.

Various changes and modifications may be made, and features described in connection with one of the embodiments may be used with the other. For example, the embodiments of FIG. 1 and 4 can be combined in such a manner that the antenna has two elements, for example elements 14, 15 of FIG. 1, which are rod antennae, and one further comparatively short antenna, such as the antenna element 101 of FIG. 4. Other combinations, of course, can be made.

The reflection recognition circuit 30 or 106, respectively, is an element well known in the radio field and a specific description thereof, therefore, is not necessary. Reference is made to the aforementioned "Sykes" publication DE-OS 25 14 181, which shows the details of a reflection or interference recognition stage. Briefly, the IF output is applied to a level detector which provides an output signal in dependence on the amplitude of the IF signal. If this signal drops below a threshold level, a pulse is generated which corresponds to the interference or reflection recognition pulse. Such pulses can be generated in any well known manner, for example as illustrated in the aforementioned publication, by providing an oscillatory circuit including a unijunction transistor. If the IF output signal is sufficiently strong, a transistor is caused to conduct which, in turn, is connected across the oscillatory circuit to inhibit generation of further pulses therefrom; if the IF signal drops below the predetermined threshold level, the transistor blocks, and the oscillatory circuit can provide a further pulse, corresponding to a reflection recognition pulse $I_E$; generation of a subsequent pulse then will depend on the state of the control transistor which, in turn, is controlled by the IF signal. Various other circuits and arrangements may be used.

I claim:

1. Method of reducing distortion in the reception of signals by vehicular FM radio receivers, in which the receiver has an antenna system (13), the system including a main antenna element (14) matched to the frequency band of the receiver, and an auxiliary rod antenna element (15, 17, 18, 19, 20) having different directonal characteristics which is short with respect to the main antenna element;

as RF stage (10);
 a distortion recognition stage (30) connected to the RF stage and providing an output signal when distorted reception is recognized, comprising the steps of
connecting said main antenna element to the receiver;
recognizing non-distortion - distortion characteristics of the signal from the RF stage in the recognition stage;
 (a) upon recognition of non-distortion, leaving said main antenna element connected;
 (b) upon recognition of a distorted signal, connecting the auxiliary antenna element of a first directional characteristic which has a different directional characteristic than said main antenna element to the RF stage of the receiver;
 (c) continuing to recognize the characteristic of the signal for a predetermined time interval ($\tau$);
 (d-1) upon sensing non-distortion characteristic of the signal during said predetermined time interval, connecting the main antenna element to the RF stage of the receiver; or
 (d-2) upon sensing continued distortion characteristic of the signal, connecting said auxiliary antenna element of a second direictional characteristic different from said first directional characteristic to the RF stage of the receiver;
 (e) and continuing steps (c) and (d); and wherein the step of connecting the auxiliary rod antenna element of different directional characteristics comprises
  selectively connecting specifically oriented shielding elements (17-20) surrounding said rod antenna element (15) to ground or chassis, while leaving other selectively oriented shielding elements unconnected to provide for selectively specific directional characteristic of the auxiliary antenna element.

2. Method according to claim 1 including the steps of generating a timing signal corresponding to said predetermined time interval;
  and connecting said timing signal, and signals representative of the switching states of the main antenna element and the auxiliary antenna element to effect, respectively, said steps (b), (c), (d) and (e).

3. Antenna and receiver system for a vehicular FM receiver, in which the FM receiver has a radio frequency (RF) stage (10);
  a distortion recognition stage (30) providing distortion recognition pulses recognizing distortion radio reception
  and comprising,
  an antenna including
  a main antenna element (14) matched to the frequency band of the receiver, and an auxiliary element (15) which is short with respect to the main antenna element, and which has directional characteristics different from that of said main antenna element;
  and a control unit (33) connected to and responsive to distortion recognition pulses from said distortion recognition stage (30) connected to and controlling switches ($r_1$, $r_2$, $r_3$, $r_4$, $r_5$) to separate the main antenna element from the RF stage of the receiver upon receiving a distortion recognition pulse and connecting the auxiliary antenna element with different directional characteristics to the RF stage of the receiver, said control unit including timing means (59) which defines a distortion switching time interval, said timing means controlling reconnection of the main antenna element if no further distortion recognition pulse is received within said timing interval, the control unit providing switching control signals to said switches to change the directional characteristics of the auxiliary antenna element if a further distortion recognition pulse is received within the timing interval;
  wherein the antenna comprises a single rod or whip antenna (14, 15) and a plurality of shielding segments (17, 18, 19, 20) surrounding a portion (15) of the rod or whip antenna, said portion of the rod or whip antenna surrounded by the shielding elements forming the auxiliary antenna element and the remainder (14) of the rod or whip antenna forming the main antenna element;
  said switches ($r_2$, $r_3$, $r_4$, $r_5$) are connected to respective shielding elements to, selectively and under control of said control unit (33) connecting one or more selected shielding elements to ground or chassis of the vehicle while leaving at least one other shielding element ungrounded to provide directional effects to the portion of the rod or whip antenna (13) positioned within said shielding elements and forming said auxiliary antenna element (15);

and wherein said switches further include an isolating switch ($r_1$) separating the at least partially shielded portion forming the auxiliary antenna element (15) from the remainder forming the main antenna element (14).

4. System according to claim 3, wherein the control unit comprises a logic circuit, and said switches include relays (R1 . . . R5) which are respectively and selectively controlled by said logic circuit.

5. System according to claim 4, wherein said timing comprises a monostable flip-flop (59);
  and said logic circuit includes at least one frequency divider (60) and a group of logic gates (62, 67, 68, 69, 70, 89, 90, 91, 92) which control the signal level at a plurality of outputs (39-42) connected to and controlling said switches to cyclically connect respectively differently oriented shielding elements (17-20) to ground or vehicle chassis upon sensing sequential distortion recognition pulses from said distortion recognition stage (30), said logic circuit having a further output (38) connected to and controlling said isolating switch to separate the auxiliary antenna element (15) from the main antenna element (14) for the duration of said time interval ($\tau$) defined by the timing period of said monostable flip flop.

6. System according to claim 3, wherein the distortion recognition stage provides an output pulse upon each recognition of a distorted signal;
  and said timing means re-starts said timing interval upon reception of sequential distortion recognition pulses.

7. System according to claim 3, wherein the control unit comprises a digital logic circuit;
  said timing means comprises a monostable flip-flop (59) connected to and controlled by the distortion recognition pulses ($I_E$) to be SET upon receipt of a distortion recognition pulse and thus starting said time interval.

8. System according to claim 7, wherein said time interval is in the order of about 3 to 10 seconds.

9. System according to claim 3, wherein the length of the auxiliary antenna element (15) shielded by said shielding elements (17-20) is in the order of about one-third of the overall length of the rod or whip antenna (13).

10. System according to claim 3, wherein the control unit comprises a plurality of transistors (43-47) and relay coils (R1-R5) are respectively connected in respective collector-emitter paths of said transistors, said transistors being rendered conductive or blocking in accordance with the state of said timing means and control signals derived from said control unit.

11. Antenna and receiver system for a vehicular FM receiver, in which the FM receiver has a radio frequency (RF) stage;
  a distortion recognition stage (106) providing distortion recognition pulses recognizing distortion radio reception
  and comprising,
  an antenna system including
  a main antenna element (100) in form of a rod, or whip antenna matched to the frequency band of the receiver, and a plurality of auxiliary antenna elements (101, 102) which are short with respect to the main antenna element and located on or in a window of the vehicle and respectively positioned at different locations in the vicinity of different portions of structural components of the vehicle, said structural components forming shields imparting different directional characteristics to the respective auxiliary antenna elements, and which due to their position in or on a window of the vehicle have directional characteristics different from that of said main antenna element;

a control unit (108) connected to and responsive to distortion recognition pulses from said distortion recognition stage (106);

a plurality of switches ($r_{10}$, $r_{11}$, $r_{12}$) controlled by said control unit to disconnect the main antenna element from the RF stage of the receiver upon receiving a distortion recognition pulse and connecting an auxiliary antenna element with a different directional characteristic to the RF stage of the receiver, said control unit including timing means (109) which defines a distortion switching time interval, said timing means controlling reconnection of the main antenna element if no further distortion recognition pulse is received within said timing interval, the control unit providing switching control signals to said switches to change the directional characteristics of the auxiliary antenna elements if a further distortion recognition pulse is received within the timing interval.

12. System according to claim 11, wherein said main antenna element comprises a pair of coaxial antenna rod elements (14, 15), and said switches include an isolating switch ($r_1$) selectively connecting said coaxial antenna elements together.

13. System according to claim 11, wherein at least one of the auxiliary antenna elements is positioned close to a window support frame part of the vehicle.

14. System according to claim 11, wherein the plurality of auxiliary antenna elements are positioned close to different window support frame parts of the vehicle.

* * * * *